June 4, 1940.  J. R. GRUETTER  2,203,141
PASTEURIZING APPARATUS
Filed Nov. 10, 1938  2 Sheets-Sheet 1
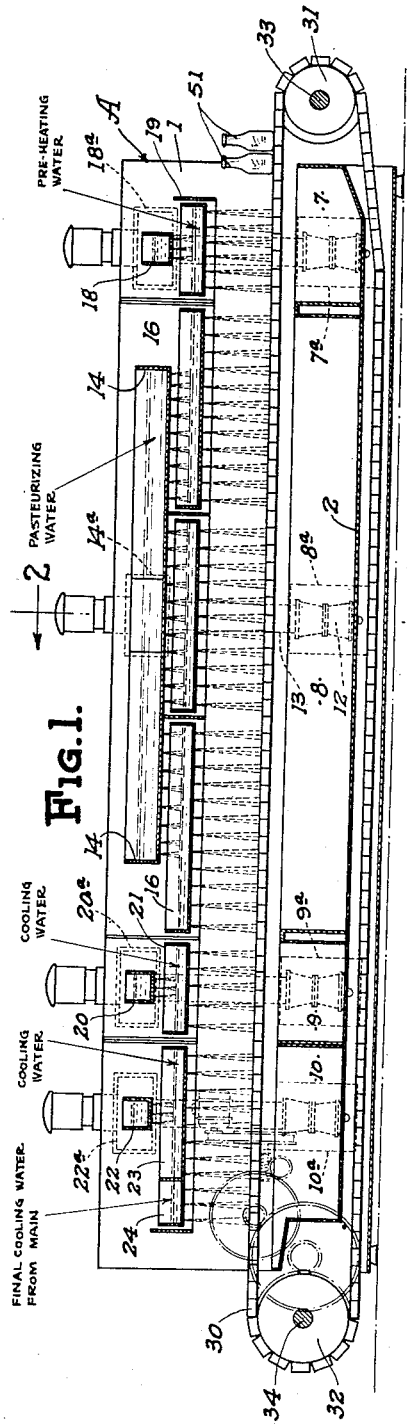
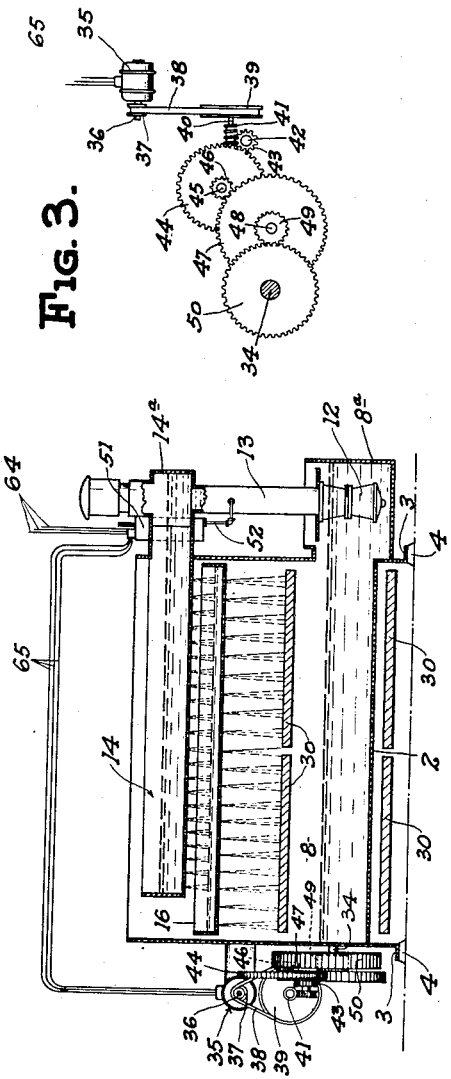
INVENTOR.
John R. Gruetter
BY Hull, Brock & West
ATTORNEYS.

June 4, 1940.    J. R. GRUETTER    2,203,141
PASTEURIZING APPARATUS
Filed Nov. 10, 1938    2 Sheets-Sheet 2

INVENTOR.
John R. Gruetter
BY Hull, Brock & West
ATTORNEYS.

Patented June 4, 1940

2,203,141

UNITED STATES PATENT OFFICE 2,203,141

PASTEURIZING APPARATUS

John R. Gruetter, Chicago, Ill., assignor to The Liquid Carbonic Corporation, Chicago, Ill., a corporation of Delaware Application November 10, 1938, Serial No. 239,800

6 Claims. (Cl. 126—272)

This invention relates to pasteurizing apparatus of the type wherein containers, such as bottles, are placed on an endless conveyor and are brought successively beneath stations delivering sprays of preheating water, sprays of water heated to pasteurizing temperature, and thence beneath sprays of water of progressively decreasing temperatures whereby the containers are finally delivered in a pasteurized but cooled condition and without any material breakage of the containers where the latter are made of frangible material such as glass.

With standard apparatus of the type to which my invention here is particularly applicable, no means are provided for ascertaining whether there may be a stoppage in the supply of pasteurizing water, such as may occur through the clogging of the pump or pumps which supply the water to the receptacle or receptacles from which the water is sprayed upon the containers therebelow, or a stoppage in such supply due to any other cause. Where such stoppage or interruption of supply occurs, the bottles or other containers will be delivered from the pasteurizer in unpasteurized condition. My invention resides in means for preventing the highly undesirable operation referred to and, more particularly, in means for controlling the drive of the conveyor through the supply of the pasteurizing water to the place where it is to be sprayed upon the containers therebeneath.

Figure 4:
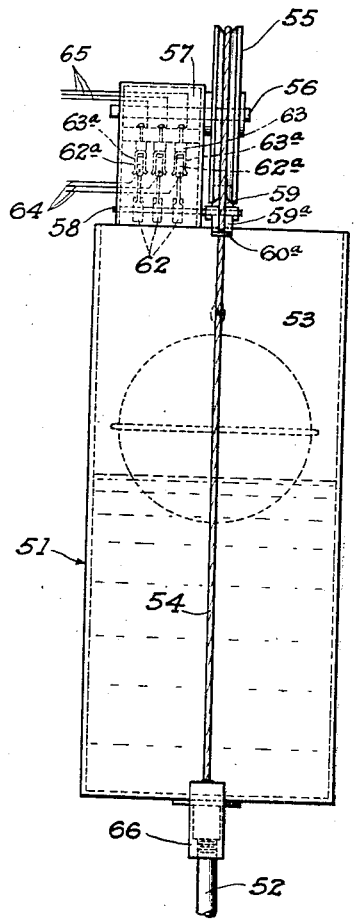

In the drawings forming part hereof, I have shown my invention embodied in a pasteurizer of standard type. Fig. 1 represents a longitudinal sectional view through such a pasteurizer; Fig. 2 a transverse sectional view of the pasteurizer taken on the line 2—2 of Fig. 1; Fig. 3 a detail in elevation showing more or less diagrammatically the means for driving the pasteurizer conveyor; Fig. 4 a detail in elevation of the mechanism which I employ for controlling the drive of the conveyor through the supply of pasteurizing water to a spraying receptacle or receptacles; and Fig. 5 a detail in vertical section through the mechanism shown in Fig. 4 and taken at right angles with respect to the former view.

Describing by reference characters the various parts shown in the drawings, A denotes the pasteurizer housing, the same comprising the side walls 1 and a bottom wall 2, the side walls being shown as provided each with an outwardly projecting flange 3 at its lower end, said flanges being supported by feet 4. The bottom wall of the housing may constitute a floor for transversely extending tanks 7, 8, 9 and 10 from which preheating water, pasteurizing water, and cooling water of successively reduced temperature is delivered above and sprayed upon the containers which are conducted through the pasteurizer. Each of the tanks 7, 8, 9 and 10 has a lateral extension 7$^a$, 8$^a$, 9$^a$ and 10$^a$, respectively, forming a receptacle communicating therewith and in which extension there is located the lower inlet portion 12 of a pump of standard construction by which liquid from each of these tanks is delivered from the upper portion of the pump provided therefor into the appropriate spraying receptacle located above such tank. Suitable means (not shown) are provided for heating to the desired temperatures the water in the tanks 7, 8, 9 and 10.

In Fig. 2 I have shown the pump which is utilized for pumping pasteurizing water from the tank 8, through a lateral extension thereof, into the lateral extension of a distributing receptacle thereabove, from which receptacle the liquid is in turn supplied to three spraying pans or receptacles arranged therebeneath. In this view, the lateral extension of the tank is indicated at 8$^a$, the lower and intake portion of the pump at 12, the outlet conduit of the pump at 13, the distributing receptacle at 14 and its extension at 14$^a$, one of the spraying receptacles beneath the receptacle 14 being shown at 16. Similar pumps are shown for supplying the preheating water and the cooling water of successively lowered temperature to the respective spraying receptacles, said additional pumps and the parts thereof being designated by the numerals applied to the pump shown in Fig. 2.

The pump for preheating water is located at the front or receiving end of the housing and communicates with an extension 7$^a$ of the tank 7 and delivers the water supplied from the said extension into a lateral extension 18$^a$ of the transversely arranged receiving and distributing receptacle 18 located above the spraying pan or receptacle 19.

The first pump for supplying cooling water to the containers passing therebeyond communicates with the extension 9$^a$ of the tank 9 and delivers this water to a lateral extension 20$^a$ of the transverse receiving and distributing receptacle 20 which in turn delivers the water into the spraying receptacle 21. The second pump for supplying still cooler water to the container passing therebeyond is located in an extension 10$^a$ of the tank 10 and delivers water therefrom into a lateral extension 22$^a$ of the transversely extending receiving and distributing receptacle 22 and thence into a spraying pan or receptacle 23. The final cooling water is delivered from the main (not shown) into a spraying pan or receptacle 24 at the rear or outlet end of the pasteurizer.

As is well known, the preheating water is of such temperature as to raise the temperature of bottles or other glass containers to a point where they will not be broken by the heated water employed in the pasteurizing zone. The cooling water employed in each of the tanks 9 and 10 is heated to a temperature whereby the containers which have been pasteurized will have their temperature successively reduced until they reach the final spraying station 24 where they can withstand the temperature of the water from the main.

30 denotes an endless conveyor mounted on sprocket wheels 31 and 32, located at the front and rear of the apparatus, respectively, the sprocket wheels 31 being carried by a shaft 33 and the sprocket wheels 32 being carried by the shaft 34. Power is applied to the shaft 34 and the conveyor is driven thereby, through the sprocket wheels 32. As shown in Figs. 1 and 3, conventional means are provided for driving the conveyor at the requisite speed for insuring the pasteurizing of the bottles or the other containers which are conducted through the apparatus. In these views, 35 denotes an electric motor having a shaft 36 provided with a pulley 37 by means of which and a belt 38 a larger pulley 39 is driven, the said pulley carrying a shaft 40 shown as having a worm drive, through the worm 41, with the shaft 42, which is provided with a pinion 43 meshing with the gear 44 having a shaft 45 provided with a pinion 46 meshing with the gear 47 which in turn drives the shaft 48 having a pinion 49 thereon meshing with the gear 50 on the shaft 34. The foregoing driving connections effect a reduction in speed between the shaft 36 and the shaft 34 which will enable the conveyor to be moved at the desired low speed through the housing.

The parts thus far described may be of any standard construction and, in their details form no part of my invention. However, as pointed out hereinbefore, should there be any cessation in the supply of pasteurizing liquid, the bottles or similar containers 51 on the conveyor will be delivered by the conveyor without having been pasteurized, and this condition may exist without the knowledge of the operator of the apparatus. In order to render such highly undesirable condition impossible of occurrence, I have provided the following construction whereby, on cessation of the supply of pasteurizing liquid to the bottles or other containers, the movement of the conveyor will be stopped, so that the operator will be apprised at once of this failure in operation and take the steps necessary to remedy the same.

Figure 5:
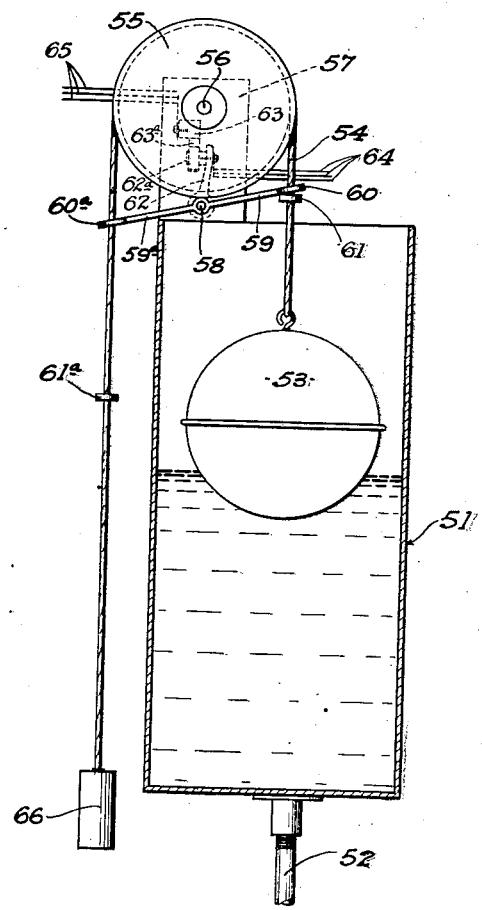

51 denotes a float chamber which receives pasteurizing water from the pipe 52 which communicates with the pump delivery conduit 13 at a point below the bottom of the receptacle 14 and the bottom of its extension 14a. This float chamber is shown as extending above and somewhat below the adjacent extension of the receptacle 14, and the pipe 52 is shown as communicating with the bottom thereof. In common with the receptacle 14, it has its top open to the atmosphere, whereby the water will stand at the same level in the float chamber and in said receptacle. 53 denotes a float within the said chamber having a flexible member, such as a small cable 54, connected to the upper end thereof, said flexible member extending around a sheave 55, the shaft 56 whereof is journaled in the vertical walls 57 of a casing which is shown as supported from the top of the float chamber. Journaled in the lower portion of the housing is a shaft 58 having a bar secured thereto, said bar comprising the arms 59, 59a extending in opposite directions from the said shaft and each provided at its end with a loop 60, 60a for the passage therethrough of the leads of the flexible member located on opposite sides of the sheave. Secured to the opposite leads of the flexible member are abutments 61, 61a. These abutments are of such size as will not enable them to pass through the loops 60, 60a respectively. Mounted on the shaft 58 are switch members 62 the upper ends of which are provided with contacts 62a adapted, when the float 53 is in its elevated position, as shown in Figs. 4 and 5, to engage contacts 63a on the cooperating switch members 63. 64 denotes conductors from the power line which are connected with the switch members 62, while 65 denotes conductors leading from the contacts 63a to the motor 35.

With the parts constructed and arranged as described, the operation will be readily understood. In starting the apparatus, the switches may be closed by pulling down upon the end of the flexible member or cable bearing the counterweight 66 until the float is raised a sufficient distance to bring the abutment 61 into contact with the looped end of the arm 59, thereby to rock the shaft 58 and close the circuit through the switches 62, 63 to the motor 35. Before the bottles or other containers will have been advanced beyond the preheating station, an ample supply of pasteurizing water will have been delivered to the receptacles 16 for spraying the containers therebeneath and the float will have been lifted by such liquid to the position shown in Figs. 4 and 5. Pasteurizing liquid will continue to be delivered upon the containers passing beneath said receptacles until such time as the level of liquid in the receptacle 14 and in the float chamber 51 shall have fallen to an extent to enable the abutment 61a to engage the looped end 60a of the arm 59a and rock the lever 58 in a direction to open the circuit to the motor 35. The abutment 61a may be so placed on the flexible member or cable as to insure the cessation of driving the conveyor either at the time when the water shall have fallen to the bottom of the receptacle 14, or preferably slightly before this occurs. Separate means may be provided for operating the conveyor to permit the removal of unpasteurized bottles therefrom and to permit the resumption of the operation of the pasteurizer thereafter in its ordinary manner.

Having thus described my invention, what I claim is:

1. A pasteurizing apparatus comprising in combination a conveyor for articles to be pasteurized, a station comprising one or more receptacles located above said conveyor and provided with means for delivering pasteurizing liquid upon the articles conducted therebeneath by said conveyor, means for driving said conveyor, means for supplying liquid to said receptacle or receptacles, and means operative by the cessation of the supply of said liquid to said station for stopping the said driving means.

2. A pasteurizing apparatus comprising in combination a housing, a conveyor for articles to be pasteurized, means for driving said conveyor, a station in said housing comprising one or more receptacles located above said conveyor and provided with means for delivering pasteurizing liquid upon the articles conducted therebeneath by said conveyor, a receiving and distributing receptacle above the first mentioned receptacle or receptacles and provided with means for delivering pasteurizing liquid thereto, means for supplying pasteurizing liquid to the receiving and distributing receptacle, and means operative by the cessation of the supply of liquid to the receiving and distributing receptacle for stopping the means for driving the said conveyor.

3. A pasteurizing apparatus comprising in combination a conveyor for moving articles to be pasteurized, a station, a receptacle at said station for delivering pasteurizing liquid upon the articles on said conveyor during their transit past said station, means for supplying pasteurizing liquid to said receptacle, an electric motor for driving said conveyor, an electric circuit including said motor, and means controlled by changes in the level of the liquid in said receptacle for making and breaking the said circuit.

4. A pasteurizing apparatus comprising in combination a conveyor for moving articles to be pasteurized, a receptacle above said conveyor provided with means for delivering pasteurizing liquid upon the articles on said conveyor during their transit below said receptacle, means for driving said conveyor, a float responsive to the level of liquid in said receptacle, and means operative by the movement of said float for starting and stopping the driving means.

5. In the apparatus recited in claim 4, the means for driving the conveyor comprising an electric motor, switch mechanism for said motor, and means operative by the raising and lowering of the float, responsive to the raising and lowering of the level of the pasteurizing liquid in its receptacle, for closing and opening the said switch mechanism.

6. A pasteurizing apparatus comprising in combination a conveyor for articles to be pasteurized, a receptacle located above the said conveyor and having means for delivering pasteurizing liquid upon the articles conducted therebeneath by the conveyor, and means for driving the said conveyor, the said means comprising an electric circuit including an electric motor, a float responsive to variations in the level of the liquid in said receptacle, and switch mechanism operative by said float for opening the circuit when the liquid level in said receptacle falls to a predetermined point.

JOHN R. GRUETTER.